(12) United States Patent
Chang et al.

(10) Patent No.: US 7,855,481 B2
(45) Date of Patent: Dec. 21, 2010

(54) STATOR LEAD RETAINER

(75) Inventors: Chih-Chin Chang, Hsi-Chih (TW);
Ronald Hsiung, Hsi-Chih (TW)

(73) Assignee: Vistory Industrial Corporation,
Hsi-Chih (TW)

( * ) Notice: Subject to any disclaimer, the term of this patent is extended or adjusted under 35 U.S.C. 154(b) by 0 days.

(21) Appl. No.: 11/736,268

(22) Filed: Apr. 17, 2007

(65) Prior Publication Data
US 2007/0252455 A1     Nov. 1, 2007

(30) Foreign Application Priority Data
Apr. 27, 2006   (TW)   ............... 95207186 U
Apr. 27, 2006   (TW)   ............... 95207187 U

(51) Int. Cl.
*H02K 11/00* (2006.01)
(52) U.S. Cl. ......................................... 310/71; 174/650
(58) Field of Classification Search ............... 310/71, 310/87, 88; 174/650, 151, 152 R, 152 G, 174/153 G, 153 R, 135
See application file for complete search history.

(56) References Cited

U.S. PATENT DOCUMENTS

| | | | | |
|---|---|---|---|---|
| 2,488,387 A | * | 11/1949 | Elsey | ............................ 310/56 |
| 2,498,238 A | * | 2/1950 | Berberich et al. | ..... 174/120 SC |
| 2,623,920 A | * | 12/1952 | Ford | .......................... 336/219 |
| 2,626,223 A | * | 1/1953 | Ford et al. | ................... 525/421 |
| 2,695,276 A | * | 11/1954 | Hatcher | ....................... 525/523 |
| 2,836,740 A | * | 5/1958 | Gibson et al. | ................... 310/45 |
| 2,837,669 A | * | 6/1958 | Alec et al. | ...................... 310/45 |
| 4,181,393 A | * | 1/1980 | Lill | .............................. 439/402 |
| 4,656,378 A | * | 4/1987 | Atherton et al. | ................ 310/71 |
| 5,175,458 A | * | 12/1992 | Lemmer et al. | ................ 310/71 |
| 5,204,566 A | * | 4/1993 | Borgen et al. | .................. 310/71 |
| 5,659,213 A | * | 8/1997 | Imashiro et al. | ................ 310/71 |
| 5,880,179 A | * | 3/1999 | Ito et al. | ....................... 523/433 |
| 6,429,556 B1 | * | 8/2002 | Nakamura et al. | ............. 310/71 |
| 6,555,937 B2 | | 4/2003 | Kurahashi et al. | |
| 6,617,723 B1 | | 9/2003 | Shichijyo | |
| 6,800,974 B2 | | 10/2004 | Shichijyo | |
| 6,952,060 B2 | * | 10/2005 | Goldner et al. | ................ 310/12 |

FOREIGN PATENT DOCUMENTS

JP          02197232 A  *  8/1990

* cited by examiner

*Primary Examiner*—Quyen Leung
*Assistant Examiner*—Naishadh N Desai
(74) *Attorney, Agent, or Firm*—Clifford B. Perry

(57) ABSTRACT

A stator lead retainer includes a stator lead retainer body having a plurality of through-holes extending longitudinally therethrough, each through-hole configured for receiving a stator lead. The stator lead body is constructed from an elastic material and is operable to accommodate stator leads of different cross-sectional shapes and diameters.

10 Claims, 3 Drawing Sheets

STATOR LEAD RETAINER

CROSS REFERENCE TO RELATED APPLICATIONS

This US patent application claims priority to, and incorporates by reference in their entirety, each of the following patent applications:

TW patent application No. 95207186, filed Apr. 27, 2006, and entitled "Stator lead Retainer," now TW patent M302826; and TW patent application No. 95207187, filed Apr. 27, 2006, and entitled "Stator Lead Retainer and Assembly," now TW patent M302827.

This application also incorporates by reference the subject matter of the commonly-owned and concurrently-filed US patent application entitled "Stator Lead Retainer Device," Ser. No. 11/736,283.

BACKGROUND

The present invention is related to engine circuitry, and more particularly to stator lead retaining structures.

Whereas the working environment of a motor or generator is usually vulnerable to frequent vibration, high humidity, and dust; a stator lead retainer is usually provided to effectively clamp the stator lead in position to avoid contact shortage or rust corrosion upon external connection the lead of the internal (stator) winding for conduction.

FIG. 1 is a schematic view showing a construction of a stator lead retainer known in the prior art. The prior art stator lead retainer includes a wiring retainer 10 made of a hard plastic material (or any other harder insulation material) having multiple (two as illustrated) through-holes in rectangular section that are in parallel to one another to receive penetration of two stator leads 3 (copper wire in rectangular section for industrial purpose) extending from the motor or the generator. On each of both sides of the wiring retainer 10 by each through-hole is provided with one linking conductor 21 for external connection so that the linking conductor 21 may be processed to contact the stator lead 3 thus to produce better electric connection results for the lead 3 to connect to an external device (e.g., a rectifier).

The wiring retainer 10 of the prior art is made of hard plastic material, and as a result, the form and size of the through-hole (flat or rectangular) can only adapt to the stator lead 3 of generally the same wire diameter. As a consequence, stator leads 3 of different diameters and/or cross-sectional shapes cannot be easily accommodated by the prior art stator lead retainer. This deficiency requires the design and manufacture of special stator lead retainer designs for different stator leads, and correspondingly, greater expense for same.

What is therefore needed is a stator lead retainer design which can accommodate stator leads of different cross-sectional shapes and diameters.

SUMMARY

The present invention in a particular embodiment includes a stator lead retainer formed from a stator lead retainer body having a plurality of through-holes extending longitudinally therethrough, each through-hole configured for receiving a stator lead. Further particularly, the stator lead retainer body is constructed from an elastic material and is operable to accommodate stator leads of different cross-sectional shapes and diameters.

In another embodiment of the present invention, a stator lead retainer body includes two or more through-holes extending longitudinally therethrough, each through-hole configured for receiving a stator lead. The stator lead retainer body further includes a flanged end which is formed from an elastic material, whereby the flanged end is configured to be compressibly secured between a generator and a rectifier.

In another embodiment of the present invention, a stator lead retainer is formed from a stator lead retainer body and includes a plurality of through-holes extending longitudinally therethrough, each through-hole configured for receiving a stator lead. At least one of plurality of through-holes includes a cross-sectional shape which is different from the cross-sectional shape of the stator wire which is to be inserted therein.

These and other features of the invention will be better understood in light of the following drawings and detailed description.

For clarity, previously identified features retain their reference numbers in subsequent drawings.

DETAILED DESCRIPTION OF EXEMPLARY EMBODIMENTS

Figure 1:
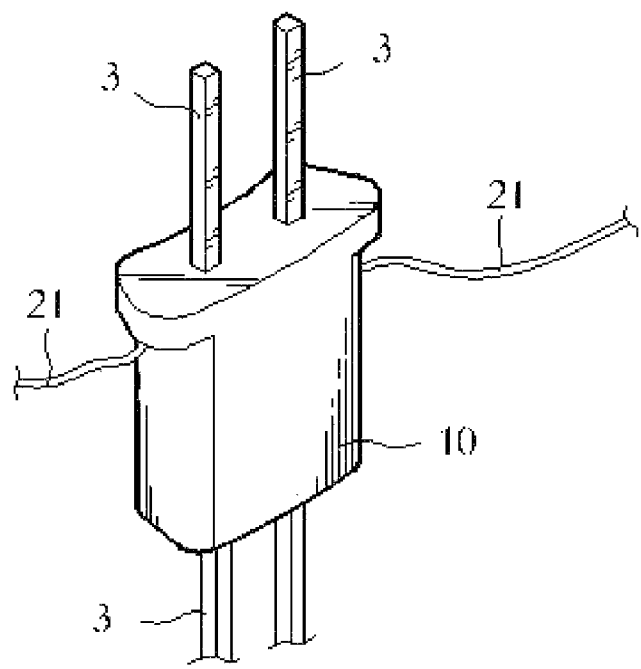
FIG. 1 is a schematic view showing a construction of a stator lead retainer known in the prior art.
Figure 2:
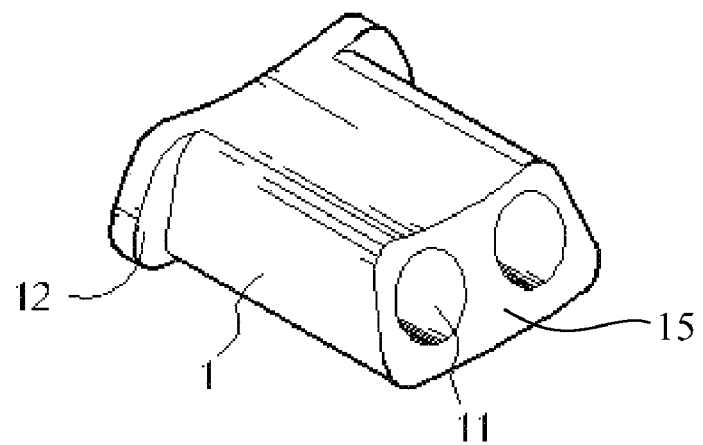
FIG. 2 is a schematic view showing a stator lead retainer in accordance with one embodiment of the present invention.
Figure 3:
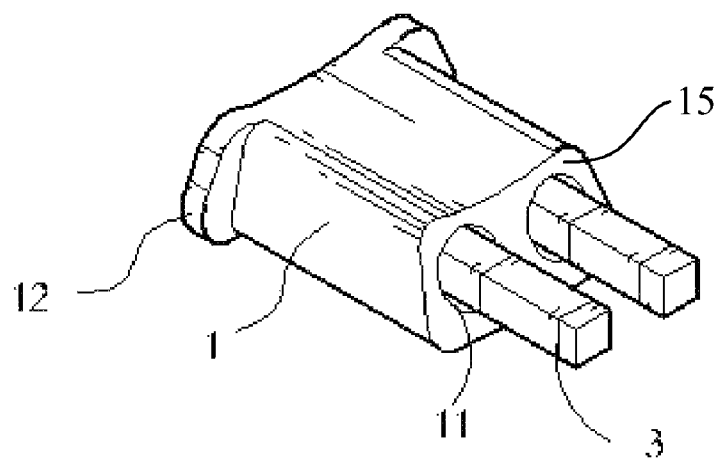
FIG. 3 is a schematic view showing a stator lead retainer in accordance with one embodiment of the present invention.

FIGS. 2 and 3 illustrate schematic views showing a stator lead retainer in accordance with one embodiment of the present invention. The stator lead retainer is formed from a stator lead retainer body 1 having a plurality of through-holes 11 extending longitudinally through the stator lead retainer 1, each through-hole 11 configured for receiving a stator lead 3. The stator lead retainer body 1 is constructed from an elastic material, some examples of which include a variety of materials, for example polysiloxane. Those skilled in the art will appreciate that other materials may be used in alternative embodiments. Generally, any material having a moduleus of elasticity in the range of 0.0007 to 0.004 Gpa may be used.

In a particular embodiment of the invention, the through-holes 11 are of a much smaller bore size (circular or rectangular) than the cross-sectional area of the intended stator leads 3 which are to be inserted therethrough. For example, one or more of the bore sizes of the through-holes 11 is less than 90% of the cross-sectional area or diameter of the stator leads 3, or more particularly, less than 75% of the cross-sectional area or diameter of the stator leads 3, or even more particularly, less than 50% of the cross-sectional area or diameter of the stator leads 3. The elastic properties of the stator lead retainer body 1 allows the insertion, and facilitates securing of a larger cross-section/diameter stator lead 3 within a smaller bore size through-hole 11.

Further particularly, the through-holes 11 may have any particular cross-sectional bore shape, e.g., be of a circular, elliptical, square, or rectangular cross-section shape, which may be the same or different from the cross-sectional shape of the stator lead which is to be inserted within the through-hole 11. The elastic properties of the stator lead retainer 1 allows the insertion, and facilitates securing of a larger and/or differently shaped cross-section/diameter stator lead 3 within the through-hole 11. In this manner, the elastic properties also permit a wide range and cross-sectional shapes of stator leads to be used with the stator lead retainer body 1. As an example, the bore shape of the through-holes 11 may be circular (e.g., circular or elliptical), and the cross-sectional shape of the stator leads 3 may be non-circular (e.g., square or rectangular-shaped).

In an exemplary embodiment, the stator leads 3 is constructed from copper material and the through-holes 11 are circularly-shaped and sized to be 75% less than the cross-sectional area of the rectangular stator leads 3 which are to be inserted therethough. Those skilled in the art will appreciate that other materials, as well as other bore sizes and cross-sections of the through-holes 11 may be implemented in alternative embodiments of the present invention.

Further exemplary, the stator lead retainer body 1 further includes a flanged end 12 and a beveled end 15; both, in a particular embodiment, integrally constructed with the stator retainer body 1 from the aforementioned elastic materials. In a particular embodiment, the flanged end 12 is constructed from the aforementioned elastic material, such that it can be compressibly secured between a generator casing and a rectifier casing, as will be further illustrated below. In such an embodiment, the elastic properties of the flanged end advantageously provides a shock absorbing interface between the generator and rectifier casings to minimize wear and tear on each unit.

Figure 4:
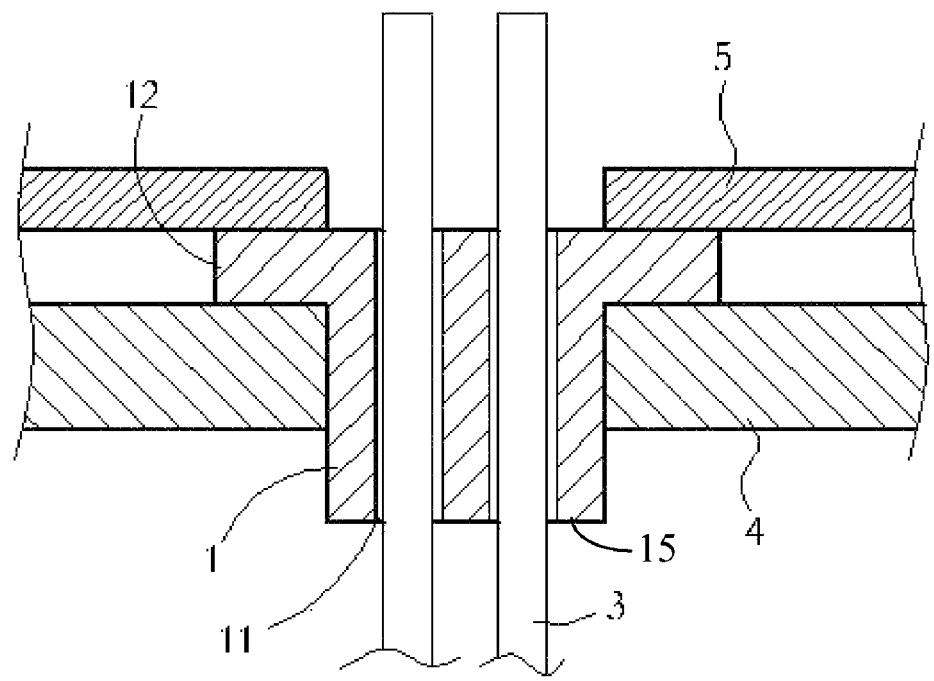
FIG. 4 is a cross-sectional view showing a stator lead retainer connected to a casing of a generator and a casing of a rectifier in accordance with one embodiment of the present invention.

FIG. 4 is a cross-sectional view showing a stator lead retainer connected to a casing of a generator and a casing of a rectifier in accordance with one embodiment of the present invention. As noted above, the flanged end 12, formed of a flexible elastic material in a particular embodiment, forms a shock absorbing interface between the generator casing 4, and the rectifier casing 5 to minimize wear and tear on these two units.

Figure 5:
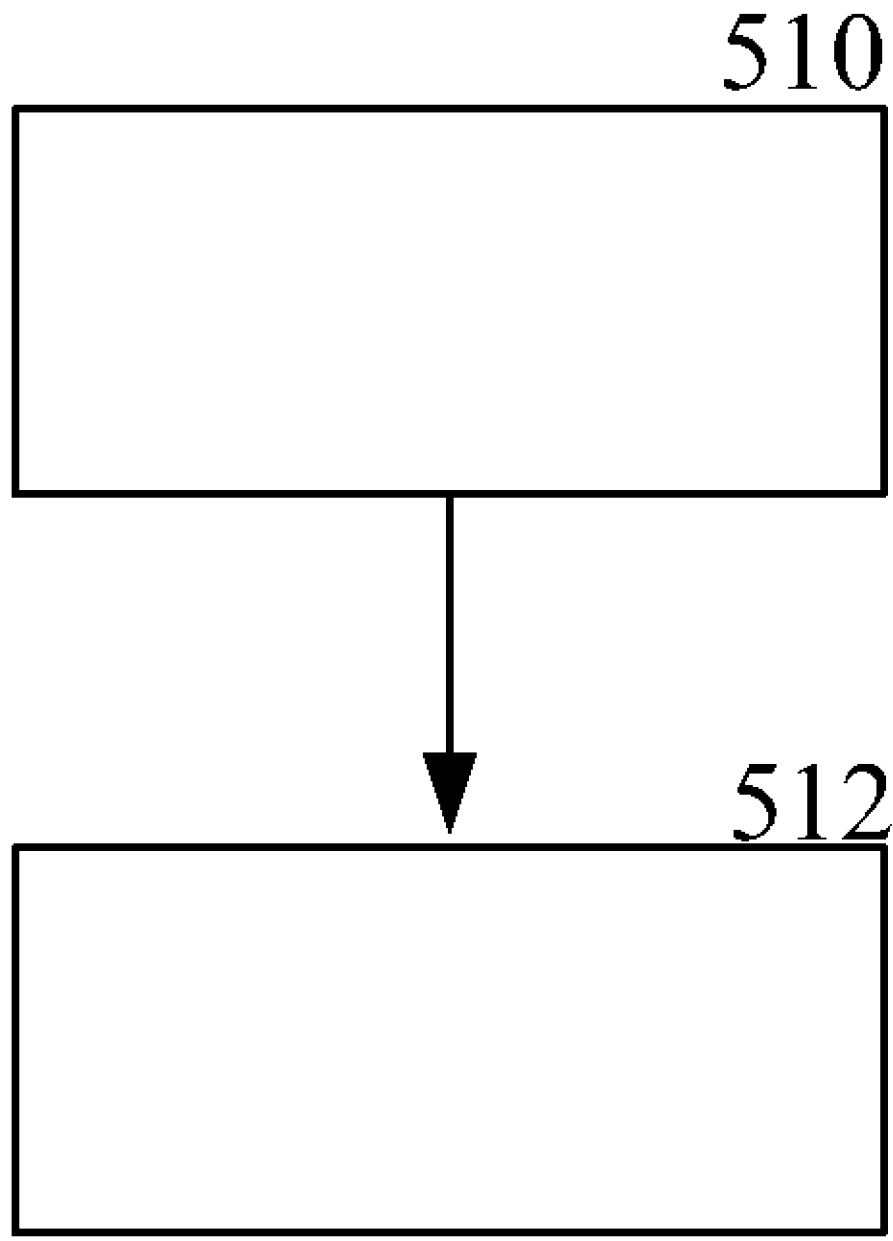
FIG. 5 illustrates a method of manufacturing a stator lead retainer in accordance with one embodiment of the present invention.

FIG. 5 illustrates an exemplary method of manufacturing a stator lead retainer in accordance with one embodiment of the present invention. At operation 510, a stator lead retainer body 1 of elastic material is constructed. At operation 512, a plurality of through-holes 11 are formed longitudinally through the elastic stator retainer body 1.

In a particular embodiment, the stator lead retainer body 1 is formed from a material having a modulus of elasticity in the range of 0.0007 to 0.004 Gpa. For example, the stator retainer body 1 may be constructed from polysiloxane. In other embodiments, operation 510 includes constructing the stator lead retainer body 1 to have a flanged end, or alternatively, a beveled end.

In a particular embodiment of operation 512, the cross-section of at least one of the plurality of through-holes 11 is formed in a different shape/geometry as compared with the cross-section of a stator wire 3 which is to be inserted therein. For example, one or more of the through-holes 11 may be formed of a circular (or elliptical) cross-sectional shape, and a stator wire 3 which is to be inserted therein may be of a rectangular (or square) cross-sectional shape, or visa versa. Of course, other cross-sectional shapes such as triangular, pentagon, octagon, etc. may be used as well for either of the through-hole cross-sectional shapes or the stator wire cross-sectional shapes. More generally, operation 512 may include the formation of one or more through-holes 11 having a cross-sectional shape which is different from the cross-sectional shape of a stator wire 3 which is to be inserted therein.

Alternatively, or in addition to a mis-match in the cross-sectional shapes of at least one of the through-holes 11 and a stator wire 3 which is to be inserted therein, the bore size of at least one of the plurality of through-holes 11 may also be mismatched to the bore size of a stator wire 3 which is to be inserted therein. In a particular embodiment of operation 512, one or more of the through holes 11 is formed having a bore size which is 90% or less of the cross-sectional area of a stator wire 3 which is to be inserted therein. In another embodiment of operation 512, one or more of the through-holes 11 is formed having a bore size which is 75% or less, or even more preferably, 50% or less than the cross-sectional area of of a stator wire 3 which is to be inserted therein.

The terms "a" or "an" are used to refer to one, or more than one feature described thereby. Furthermore, the term "coupled" or "connected" refers to features which are in communication with each other (electrically, mechanically, thermally, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A stator lead retainer, comprising:
a stator lead retainer body having a plurality of through-holes extending longitudinally therethrough, each through-hole configured for receiving and retaining a stator lead inserted therethrough,
wherein the stator lead body comprises an elastic material,
wherein the cross-sectional shape of at least one of the plurality of through-holes is different from the cross-sectional shape of the stator wire which is to be inserted therethrough, and
wherein each through-hole is sized to provide a compression fit to a stator lead inserted therethrough.

2. The stator lead retainer of claim 1, wherein the stator lead body is constructed from material having a modulus of elasticity in the range of 0.0007 to 0.004 Gpa.

3. The stator lead retainer of claim 1, wherein the stator lead body is constructed from polysiloxane.

4. The stator lead retainer of claim 1, wherein the through-holes comprise a generally circular cross-section, whereby the elastic material of the stator retainer body is operable to accommodate insertion of a non-circular stator lead through the generally circular cross-sectional through-holes.

5. The stator lead retainer of claim 1, wherein the stator retainer body comprises a flanged end formed from the elastic material, whereby the flanged end is configured to be compressibly secured between a generator and a rectifier.

6. A stator lead retainer, comprising:

a stator lead retainer body having a plurality of through-holes extending longitudinally therethrough, each through-hole configured for receiving and retaining a stator lead inserted therethrough, wherein the stator lead body comprises an elastic material, wherein the cross-sectional shape of at least one of the plurality of through-holes is different from the cross-sectional shape of the stator wire which is to be inserted therethrough, and wherein each through-hole comprises a cross-sectional area or diameter which is less than 90 percent of the cross-sectional area or diameter of the stator lead which is to be inserted therethrough.

7. The stator lead retainer of claim 6, wherein the stator lead body is constructed from material having a modulus of elasticity in the range of 0.0007 to 0.004 Gpa.

8. The stator lead retainer of claim 6, wherein the stator lead body is constructed from polysiloxane.

9. The stator lead retainer of claim 6, wherein the through-holes comprise a generally circular cross-section, whereby the elastic material of the stator retainer body is operable to accommodate insertion of a non-circular stator lead through the generally circular cross-sectional through-holes.

10. The stator lead retainer of claim 6, wherein the stator retainer body comprises a flanged end formed from the elastic material, whereby the flanged end is configured to be compressibly secured between a generator and a rectifier.

* * * * *